US00RE43325E

(19) United States
(12) Reissued Patent
Lang et al.

(10) Patent Number: US RE43,325 E
(45) **Date of Reissued Patent: *Apr. 24, 2012**

(54) SYSTEM AND METHOD FOR TIME-SHIFTED PROGRAM VIEWING

(75) Inventors: Richard A. Lang, Sebastopol, CA (US); Eric H. Walters, Phoenix, AZ (US)

(73) Assignee: TiVo Inc., Alviso, CA (US)

( * ) Notice: This patent is subject to a terminal disclaimer.

(21) Appl. No.: 12/560,060

(22) Filed: Sep. 15, 2009
(Under 37 CFR 1.47)

Related U.S. Patent Documents

Reissue of:
(64) Patent No.: 7,272,298
Issued: Sep. 18, 2007
Appl. No.: 09/073,452
Filed: May 6, 1998

(51) Int. Cl.
*H04N 5/76* (2006.01)

(52) U.S. Cl. ..... 386/299; 386/235

(58) Field of Classification Search ..... 386/200, 386/231, 234, 248, 262, 291, 299
See application file for complete search history.

(56) References Cited

U.S. PATENT DOCUMENTS

| | | | |
|---|---|---|---|
| 4,313,135 | A | 1/1982 | Cooper |
| 4,506,358 | A | 3/1985 | Montgomery |
| 4,602,297 | A | 7/1986 | Reese |
| 4,665,431 | A | 5/1987 | Cooper |
| 4,752,834 | A | 6/1988 | Koombes |
| 4,760,442 | A | 7/1988 | O'Connell et al. |
| 4,761,684 | A | 8/1988 | Clark et al. |
| 4,789,961 | A | 12/1988 | Tindall |
| 4,794,465 | A | 12/1988 | Van Luyt et al. |
| 4,816,905 | A | 3/1989 | Tweedy et al. |
| 4,821,121 | A | 4/1989 | Beaulier |
| 4,833,710 | A | 5/1989 | Hirashima |
| 4,862,269 | A | 8/1989 | Sonada et al. |
| 4,897,867 | A | 1/1990 | Foster et al. |

(Continued)

FOREIGN PATENT DOCUMENTS

EP 0 594 241 4/1994

(Continued)

OTHER PUBLICATIONS

Shen et al., "A Fast Algorithm for Video Parsing Using MPEG Compressed Sequences," IEEE 1995.

(Continued)

*Primary Examiner* — Robert Chevalier
(74) *Attorney, Agent, or Firm* — Sterne, Kessler, Goldstein & Fox P.L.L.C.

(57) ABSTRACT

A system and method for time-shifted viewing of broadcast television programs is disclosed. Simultaneous recording and playback are provided by using buffer storage as the source and destination of compressed or uncompressed digital video/audio programs. Full VCR-like control is provided for all playback within the buffer storage. Playback and control of recorded programs may be initiated by the user at any time after initiation of the broadcast program with simultaneous continuous recording of the ongoing live broadcast. Larger archival storage and removable is also provided for storing and building a library of programs. Viewer playback control data may be stored as part of the program or used as edit points prior to archival. Numerous options are provided for features such as continuous automatic recording in a circular buffer fashion, program archival, editing, Internet interfaces, multiple-channel recording and more.

35 Claims, 3 Drawing Sheets

U.S. PATENT DOCUMENTS

Figure 1:
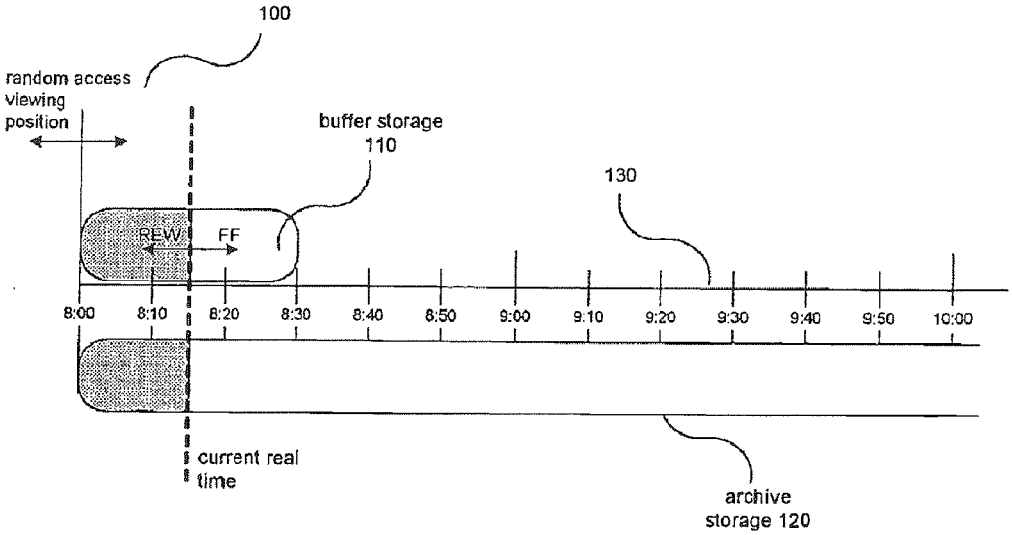

| | | | | |
|---|---|---|---|---|
| 4,920,533 | A | | 4/1990 | Dufresne et al. |
| 4,924,387 | A | | 5/1990 | Jeppesen |
| 4,949,169 | A | | 8/1990 | Lumelsky et al. |
| 4,949,187 | A | | 8/1990 | Cohen |
| 4,963,995 | A | | 10/1990 | Lang |
| 4,965,662 | A | | 10/1990 | Shiota |
| RE33,535 | E | | 2/1991 | Cooper |
| 5,014,125 | A | | 5/1991 | Pocock et al. |
| 5,018,186 | A | | 5/1991 | Kimura et al. |
| 5,019,900 | A | | 5/1991 | Clark et al. |
| 5,027,400 | A | | 6/1991 | Baji et al. |
| 5,099,319 | A | | 3/1992 | Esch et al. |
| 5,103,467 | A | | 4/1992 | Bedlek et al. |
| 5,130,792 | A | | 7/1992 | Tindell et al. |
| 5,132,992 | A | | 7/1992 | Yurt et al. |
| 5,134,499 | A | | 7/1992 | Sata et al. |
| 5,181,114 | A | | 1/1993 | Richards et al. |
| 5,191,431 | A | | 3/1993 | Hasegawa et al. |
| 5,202,761 | A | | 4/1993 | Cooper |
| 5,241,428 | A | * | 8/1993 | Goldwasser et al. ..... 360/7 |
| 5,283,639 | A | | 2/1994 | Esch et al. |
| 5,329,320 | A | * | 7/1994 | Yifrach ..... 348/738 |
| 5,371,551 | A | * | 12/1994 | Logan et al. ..... 348/714 |
| 5,414,455 | A | | 5/1995 | Hooper et al. |
| 5,438,423 | A | | 8/1995 | Lynch et al. |
| 5,442,390 | A | | 8/1995 | Hooper et al. |
| 5,455,684 | A | | 10/1995 | Fujinami et al. |
| 5,488,409 | A | * | 1/1996 | Yuen et al. ..... 725/41 |
| 5,541,738 | A | * | 7/1996 | Mankovitz ..... 386/83 |
| 5,550,594 | A | | 8/1996 | Cooper et al. |
| 5,572,261 | A | | 11/1996 | Cooper |
| 5,577,190 | A | | 11/1996 | Peters |
| 5,614,940 | A | | 3/1997 | Cobbley et al. |
| 5,675,388 | A | | 10/1997 | Cooper |
| 5,696,868 | A | | 12/1997 | Kim et al. |
| 5,706,388 | A | | 1/1998 | Isaka |
| 5,715,356 | A | | 2/1998 | Hirayama et al. |
| 5,719,982 | A | | 2/1998 | Kawamura et al. |
| 5,724,474 | A | | 3/1998 | Oguro et al. |
| 5,774,186 | A | | 6/1998 | Brodsky et al. |
| 5,787,225 | A | | 7/1998 | Honjo |
| 5,889,915 | A | | 3/1999 | Hewton |
| 5,899,578 | A | | 5/1999 | Yanagihara et al. |
| 5,920,842 | A | | 7/1999 | Cooper et al. |
| 5,937,138 | A | | 8/1999 | Fukuda et al. |
| 5,949,948 | A | | 9/1999 | Krause et al. |
| 5,991,496 | A | | 11/1999 | Kojitma |
| 6,005,564 | A | | 12/1999 | Ahmad et al. |
| 6,018,612 | A | | 1/2000 | Thomason et al. |
| 6,028,599 | A | | 2/2000 | Yuen et al. |
| RE36,801 | E | | 8/2000 | Logan et al. |
| 6,167,083 | A | | 12/2000 | Sporer et al. |
| 6,169,843 | B1 | | 1/2001 | Lenihan et al. |
| 6,226,447 | B1 | | 5/2001 | Sasaki et al. |
| 6,304,714 | B1 | | 10/2001 | Krause et al. |
| 6,498,894 | B2 | | 12/2002 | Ito et al. |
| 6,788,882 | B1 | | 9/2004 | Geer et al. |
| 2005/0025469 | A1 | | 2/2005 | Geer et al. |
| 2008/0089671 | A1 | * | 4/2008 | Lang et al. ..... 386/109 |

FOREIGN PATENT DOCUMENTS

| | | |
|---|---|---|
| EP | 0 726 574 | 8/1996 |
| EP | 0 785 675 | 1/1997 |
| EP | 0 762 756 | 3/1997 |
| GB | 2 222 742 | 8/1989 |
| WO | WO91/03112 | 8/1990 |
| WO | WO96/33579 | 10/1996 |

OTHER PUBLICATIONS

Smollar et al., "Content-Based Video Indexing and Retrieval," IEEE 1994.

Meng et al., CVEPS—A Compressed Video Editing and Parsing System, ACM Multimedia 1996.

* cited by examiner

SYSTEM AND METHOD FOR TIME-SHIFTED PROGRAM VIEWING

Matter enclosed in heavy brackets [ ] appears in the original patent but forms no part of this reissue specification; matter printed in italics indicates the additions made by reissue.

1.0 BACKGROUND OF THE INVENTION

1.1 Broadcast, VCRs

This invention is related to the field of broadcast television in all it's forms. This includes but is not limited to over-the-air broadcast, cable TV, and satellite TV. The primary focus is the broadcast paradigm, whereby programs are scheduled by the broadcaster and broadcast in real-time whereupon viewers may tune in to the program. This invention relates in particular to a device which allows users much greater flexibility in their reception and use of this programming. VCRs are one example of an earlier technology that relates to the use of broadcast programs. Using VCRs, viewers were able to record a program and play it back at their leisure, perhaps at another time. Additionally, for the first time viewers were offered limited control over the viewing. The user could pause, rewind, fast-forward and stop and re-start viewing at any time after the initial recording was complete. The broadcast program was essentially captured in an analog medium for later use. Some of the limitations of a VCR which the present invention addresses are: simultaneous record and playback from the same medium are not available; the device records only one, or at the most two, channels at a time; and a removable medium, namely magnetic tape, is required.

This invention relates in a similar fashion to the broadcast television industry but offers new and unique features not found in VCRs or any other video/audio-programming-based device.

2.0 OBJECTS OF THE INVENTION

The objects of the present invention include, but are not limited to the following. It is one object of the invention to facilitate recording of a program and allow viewing of the already-recorded material to take place while the program recording continues. It is another object of the invention to allow this simultaneous record/playback to take place on one or more channels simultaneously. It is another object of the invention to record using digital storage in many forms, using either internal or external mediums. It is another object of this invention to provide a 'save' function which incorporates semi-permanent digital storage of the recorded program as a function distinct from the simultaneous recording and playback of the program. It is another object of the invention to allow complete VCR-like control during playback. It is another object of this invention to allow the 'save' function to save edited versions of the program as defined by the playback commands used during viewing.

3.0 SUMMARY OF THE INVENTION

3.1 Overview

With the advent of digital video components, it is now possible to digitize, compress and store entire video programs using a variety of digital storage devices such as disk, digital tape, RAM, CD-ROM, DVD (Digital Versatile Disk or Digital Video Disk) and others. In the present invention, the system may be connected to a conventional video source such as broadcast TV, cable TV, satellite TV, VCR and so forth. In most cases, the video signal is in a standard RF-modulated analog format such as NTSC, PAL or SECAM. In the case of a modulated video source such as broadcast TV or cable TV, the signal is first demodulated to tune to a specific channel. This is performed by a conventional tuner such as those found in VCRs and TVs. The tuner may be used to tune into one or more channels simultaneously and more than one tuner may be included in the system. Digital inputs are also provided and will be described shortly. In the case of an incoming analog video signal, the signal is then digitized and optionally compressed using a conventional video capture board or video capture chip sets integrated into the system. This capture hardware accepts a video input, digitizes the video/audio program, optionally compresses the quantity of digital data and outputs a digital data stream which can be stored using any digital storage media. In variations of the preferred embodiment, the incoming video signal may already be in a digital format and thus not require digitization (such as a High-Definition Television (HDTV), Direct Broadcast Satellite (DBS) signal, or Internet-based broadcasts). Furthermore, the source digital signal or the digitized analog signal may or may not be compressed. The compression method used may vary and is of little consequence to the present invention which can use uncompressed digital data or compressed data. However, the current common compressed digital formats include MPEG and AVI formats. For the present invention, the selection of the video capture board or chip sets (and the compressed digital format it uses) is relevant only to the quality of the video playback and the corresponding amount of digital storage required. It is envisioned that the embodiments will vary depending on the desired quality and cost constraints for the storage media. In a relatively inexpensive consumer device, for example, a cost-efficient MEPG-1 and inexpensive four-Gigabyte hard drive might currently be used. On the other hand, a professional application might currently use MPEG-2 and RAM for very high quality along with very fast access. An important consideration regarding the selection of the video capture board and the storage media is that the data rate for writing to the digital storage must exceed the output rate of the video capture hardware. For example, if MPEG-1 is the selected compression method and the output rate of the capture/compression hardware is therefore 1.5 Mbits/second, then the sustained data rate for writing to digital storage must be greater than 1.5 Mbits/second or else data will be lost. Also, compression/decompression may take place via software algorithms implemented by the system's main CPU or in dedicated compression/decompression processors. Cable converter boxes, commonly known as "set-top" boxes provide decoding of compressed digital video streams. In such a case one embodiment of the present invention includes a provision for using the set-top box for providing the compression/decompression for the system.

3.2 Dual-Port Circular Buffer Storage

A key aspect of the present invention is it's use of FIFO dual-port storage. Digital storage systems are most commonly used in an off-line mode, that is, data is written and the data is read at some later time. For example, in a video compression and playback system, the compressed digital data would likely be written to disk during recording and, after the recording process has been completed, the data could be read for playback. In this sense, storage is used as an archive—even if the archive will be used moments later, the process of storing all the data must be completed before the data is used. In contrast, the present invention is designed to be dual-ported, that is, to be accessed for writing and reading simultaneously on the same media. In this manner, at any time after the process of capturing, optionally compressing and storage has begun, the program is also accessible for reading, decompression, playback and other functions. This can also occur while the recording process is continuing to store data using a separate and distinct section of the same storage medium. Additionally, the storage medium in the system is designed as a FIFO, which is a commonly-understood acronym in the art which stands for First In First Out. FIFO storage is essentially used as a circular buffer. The first data written into this circular buffer is the first data which is overwritten. For brevity, the terms 'buffer storage' or 'buffer' may be used herein, but the term always refers to this dual-port circular buffer storage unless otherwise noted.

In an example of the preferred embodiment, the use of this buffer storage is also taken a step further. In this embodiment, once the storage medium has been filled, the oldest data, which is the first data to have entered the FIFO, is pushed out—it is overwritten with the new data. In this manner, the buffer storage is constantly filled with the latest recorded material. The total amount of storage in the buffer determines the extants of VCR-like control for rewind and fast-forward. Alternatively, only a designated amount of the total storage may be used for recording, leaving storage available for other features of the system. In any case, this FIFO dual-port storage will be referred to herein as buffer storage. Buffer storage is always the storage used to provide direct access for the viewer to control playback of the recorded material.

3.3 Circular Buffer Example

In the example of the preferred embodiment, consider the scenario for 30 minutes of buffer storage and the viewer wishing to begin viewing of a two-hour program fifteen minutes after the scheduled broadcast start time of 8:00 p.m. At 8:00 p.m. the system begins recording the broadcast program. This may occur due to a timer previously set by the user or it may occur because the system is set to continuously record. Furthermore, the system may have been recording continuously for some time. However, in order to illustrate the nature of the dual-port circular buffer, in the present example we consider the case where the present invention has just been turned on and the buffer has been initially empty.

Recording of the broadcast program begins at 8:00 p.m. At 8:15 p.m. the user begins viewing the 8:00 p.m. material. Simultaneously, the present invention continues to record the currently-broadcast 8:15 material. At 8:30 the buffer storage is completely filled. Consequently, the oldest material, namely 8:00, is overwritten with the current 8:30 material. This process continues indefinitely, and effectively, the viewer has time-shifted their viewing by 15 minutes in the present example. (The user may time-shift up to the maximum buffer storage size configured in the system, which in the present example would be 30 minutes.)

Because of the aforementioned 15-minute time-shift the viewer may now exercise VCR-like control features on the already-recorded material. So in the present example, the viewer could fast-forward past commercials or any objectionable material. Pause, stop and rewind features are also available, enabling the viewer to re-watch a segment or to pause the playback for a phone call or other interruption.

3.4 Catching up to Live Broadcast

If the viewer were to fast-forward through the full buffer of recorded material, they would be caught up to the live broadcast. When this occurs, the present invention may switch directly to the live feed without processing the input video through the usual capture and compression. In a further embodiment, even the input video stream (which is the 'live' feed) may be processed through capture and compression if so desired. Note that In such a scenario only pause and rewind features would be available because no material is available in the buffer for fast-forwarding.

3.5 Do-Not-Overwrite Mode

In one use of the present invention, the user may be watching video playback at the same rate at which new data is being recorded. Assuming that in the time between initiating recording and playback, the buffer storage has not already been filled up, it will in fact never get filled up because data is being removed at the same rate at which it is being added.

However, in another scenario, the user may not watch video playback at all during the recording process. In one embodiment of the present invention, the buffer storage is simply allowed to fill up and the recording process stops. In such an embodiment, it is the user's responsibility to recognize the limited amount of buffer storage in the system and use the system accordingly.

Consider the embodiment whereby the system is designed to store two hours of video from one or more channels and is not set to overwrite any recorded data. In such a case, the recording process acts much like a conventional VCR—two hours of programming are recorded and when the storage media is filled, recording stops. However, the present invention, even in this particular embodiment has several unique advantages over a VCR. Programming viewing and control, by virtue of the digital data, is entirely random-access. The user may almost instantaneously skip to any desired portion of the program. Furthermore, even though the recording process stopped when storage was filled, once playback begins, the user may record new material while viewing the two hours of previously-recorded material.

3.6 Partial Summary of Unique Features

The aforementioned features in essence return control of viewing to the viewer, who is no longer forced to view objectionable broadcast material or to adhere strictly to the broadcast schedules. Complete control is returned to the viewer, especially for real-time broadcasts. To achieve this control, the viewer need only slightly delay their viewing from the normally-scheduled broadcast start time. Once the present invention's FIFO dual-port storage has recorded some portion of the programming, the viewer has complete VCR-like control over the slightly-delayed but real-time broadcast, without having to wait for the entire program to be recorded.

3.7 Multiple-Channel Device

To complete the paradigm shift into viewer-controlled broadcast television viewing, one embodiment of the present invention performs all of the aforementioned functions simultaneously on many channels. In this manner, the viewer may literally scan through, watch, or store one or more of the channels, with all of the aforementioned features. In such an embodiment, multiple video capture compression/decompression cards would be required, or cards that are designed to accommodate more than one video input stream. Multiple input streams may be realized through multiple tuners with multiple output streams to one or more storage devices or through a single tuner with multiple output streams to one or more storage devices. The total aggregate bandwidth of data to be stored might also require faster storage media. Certainly RAM-based systems could handle such bandwidths and write speeds. In a disk-based embodiment, high-speed disk drives such as RAID drives can accommodate the higher bandwidths. The total required bandwidth in any embodiment is determined by the output data rate of each video capture/compression card, chipset or software data stream. By varying the quality of the video, the compression method or the video resolution, the bandwidth may be adjusted to suit the application. In some cases, these and other parameters of the video capture/compression hardware or software are adjustable, thus allowing the output data rate to be adjusted. In other cases, this adjustment is made merely by the selection of the desired compression/decompression hardware or software versus another. In one embodiment this configurability is tied directly to the content provider. For example, certain movies may include a command which is recognized by the present invention and is used to set (at the user's discretion) the compression/decompression quality to a higher-than-usual level.

3.8 Archival and 'Save' Features

Another feature of the present invention is it's ability to off-load the buffer storage onto other more permanent media for either internal or external archival. For example, a RAM-only embodiment may also be configured with one or more other digital storage devices, such as hard-disk or recordable DVD. At any time, even automatically during recording and/or playback, the contents of the buffer storage may be selectively or continuously transferred or duplicated to these archive storage devices in order to retain a copy of the program. In some embodiments, the viewer will transfer the program to removable media such as DVD disc in order for it to be used in another device, including another of the present invention. In this manner, viewers can build a 'library' of recorded material much like is currently accomplished with conventional VCRs. Such archival may occur at any time, including before, during or after the viewing of the stored material. In one embodiment, archival occurs as a user-selected transfer from the main storage to archival storage. In another embodiment programming is continuously recorded on the larger archival storage in addition to the main storage.

The present invention, however, offers several additional advantages over the traditional analog-tape VCR library. First, due to the digital nature of the data, many different embodiments are envisioned utilizing different types of digital storage media. In some embodiments, multiple types of storage media may be used, offering different levels of off-line or on-line storage and allowing the user to account for the various cost and physical considerations of the stored media type. Archival storage may be implemented as distinct devices separate from the buffer storage or as an allocation of one large storage device, with one portion designated and used as buffer storage and another as archival storage.

Another unique feature of the storage characteristics of the present invention is that the aforementioned archival functions may be initiated at any time including after the program has been viewed in it's entirety from the buffer storage. For example, in a RAM-based embodiment, the user may elect to transfer the entire contents of the program from RAM to hard disk, while playback and recording continue, or the user may also elect to transfer after viewing from RAM is complete. The only caveat in this process is that the user must consider the overwriting, circular buffer nature of the buffer storage and that the oldest material is overwritten when the allocated amount of storage becomes full. For this reason, this overwriting feature as well as all features of the system may be user-configurable. Other examples of archival storage mediums, both internal and external, include but are not limited to: hard disk, removable hard disk, tape, optical disk, DVD or any other digital storage medium.

3.9 Save-with-Edits Feature

Another unique feature of the storage characteristics of the present invention is that the aforementioned archival functions may include interpretation of the playback control as edit events, thus modifying the copy of the program which is to be archived. For example, a user may record a TV movie, fast-forwarding past each commercial. Upon storing the viewed program, the user may elect to interpret the fast-forwarding or similar control in several ways. First, it may be taken literally, with the archived program including a control code for 'fast-forward'. Upon playback, this control could be interpreted and executed by the playback control software, thereby resulting in the playback of the program exactly as the viewer watched it, fast-forwards and all. A second manner of interpreting the fast-forward could be as an edit point, the implication being that since the user fast-forwarded past a portion of the program they did not want to view it and therefore that portion of the program need not be archived at all. In such a mode, upon playback the video would seamlessly skip past the fast-forwarded portion of the program since it was not recorded in the archive at all. And in a third manner of interpreting the fast-forward or other playback controls, these controls may not be recorded in archive at all, i.e. they may be ignored, implying that the user desires to have brand-new control over the video at playback time.

3.10 Demographic and Viewing Habits Data Collection

A further feature of the present invention is that all of the aforementioned VCR-like control features may be stored as data representing the viewer control. In other words, all of the viewer control such as fast-forward, play and pause are captured as data. This viewer control data may be used in a number of ways, including storage along with the archived program as described previously. In another embodiment of the present invention, a modem is provided for communication to other similar devices or to computers via network communication channels, such as phone lines, cable modems, and satellite. In such an embodiment, at the election of the viewer, the viewer control data may be provided to a central computer for storage. The data may later be analyzed by advertisers, broadcasters, ratings companies and so forth to receive indirect feedback from viewers regarding viewing preferences. This same communication channel may be used to transmit software upgrades to the invention, remote diagnostics, billing data or pay-per-view locking/unlocking by the content provider. In another embodiment, the modem may be replaced by a faster communications device such as a satellite receiver, Internet connection or so forth.

3.11 Network-Controlled Configurability

The aforementioned network communication channels are also used in another unique way. Since these channels provide a link to other computers, possibly on the Internet, this connection may be used to automatically set the configuration of the system from these computers. For example, in an embodiment connected to the Internet, the system also includes basic computer components sufficient to interact with the World-Wide Web. Besides the network communications channel the system also includes a video graphics card and one or more user-interface devices which may include but are not limited to: a mouse, touchpad, keyboard, trackball, remote control or voice control. With this Web-based connection, content providers or third parties may link Web pages to interact with the present invention. For example, a third party may offer pay-per-view programs, wherein the program may be ordered via the Web, and data provided via the Web so the present invention can set parameters such as record timers, video quality settings, channel tuning and so forth. The Web site may provide additional data about the offered program to aid the users in selecting programs, such as plot summaries, ratings, casts and so forth.

Many of the aforementioned features may be implemented in various modes and in some cases selectable by the user to be automatic. For example, "continuous recording" may be a mode, whereby the preferred embodiment continuously records on one or more programming channels, overwriting the oldest data as previously described. But this mode is selectable for there might be situations where this is not desirable, such as setting a timer on the present invention to record a program at a specific time. Should the user arrive home much later than expected, the recorded program is still available, instead of being recorded over by the latest program. And as another example, the aforementioned editing capabilities are configurable by the user, such as the "archive as edited" mode, in which control functions dictate an edited form of the program for archival. These functions and configurable options are all controlled through any one of several user-interface methods. In one embodiment, a remote control and on-screen menus are used. In another embodiment, buttons on the device are used, also in conjunction with on-screen menus. These and other user-interfaces are implemented alone or in combination, thus providing access to all of the unique features described herein.

DETAILED DESCRIPTION OF THE PREFERRED EMBODIMENT

FIG. 1—underlying context of functional advantages, example one

Figure 2:
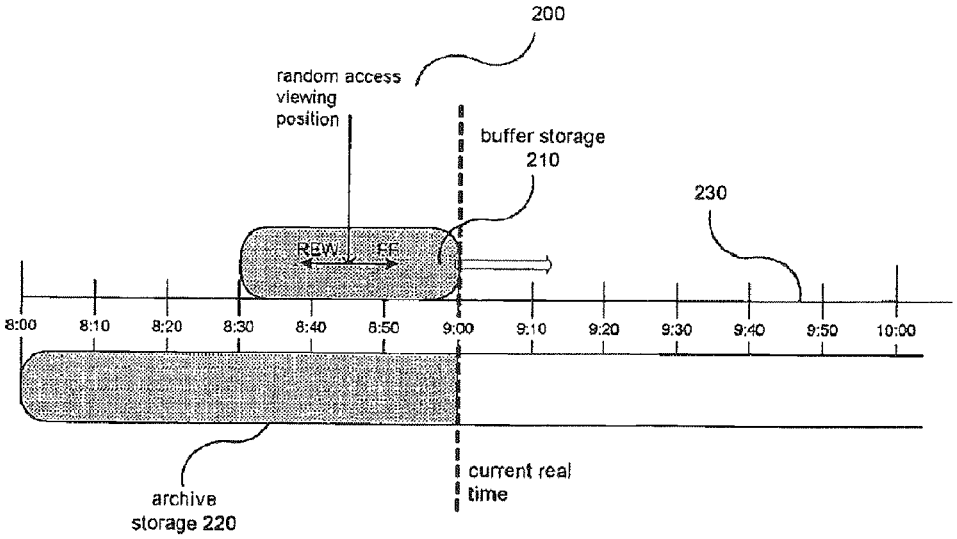

FIG. 2—underlying context of functional advantages, example two

Figure 3:
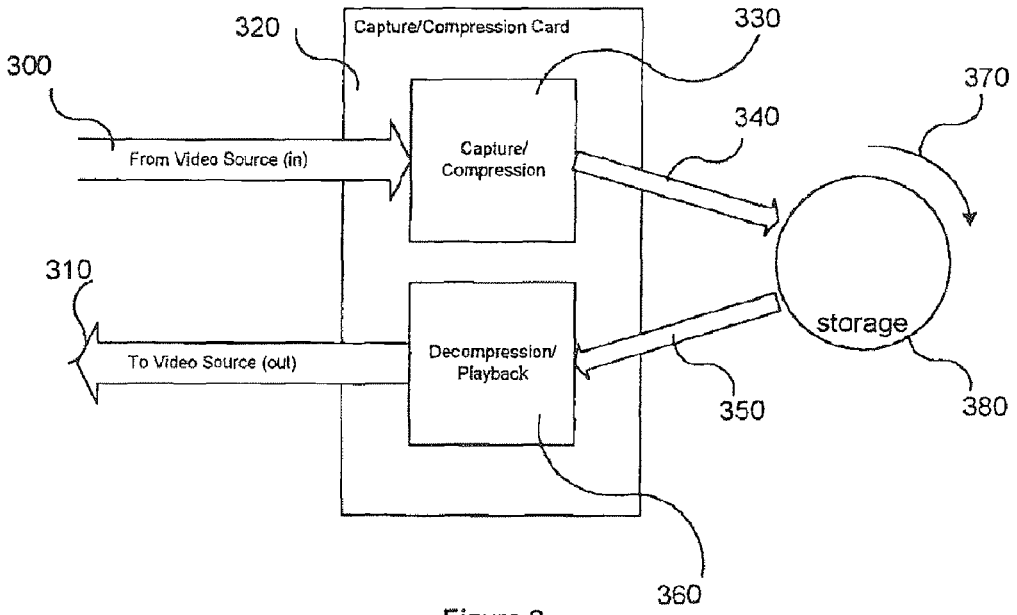

FIG. 3—operational overview

Figure 4:
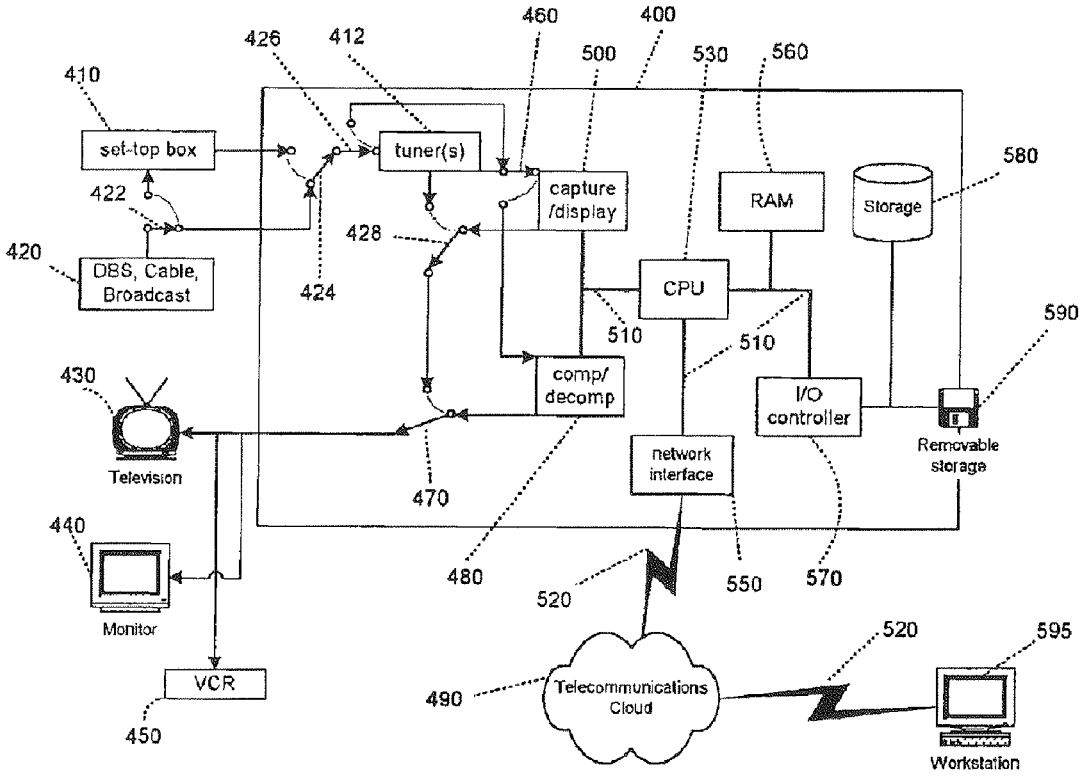

FIG. 4—block diagram

FIG. 1 illustrates the underlying context of the operation of the present invention. Timeline 130 is depicted illustrating a particular example from 8:00 to 10:00. Of course the times and durations of this example are for illustrative purposes only and any time or duration may be used. Random access viewing position 100 represents the current location within the recorded buffer from which viewing is taking place. Buffer storage 110 illustrates the use of a 30-minute buffer and once again, this is for illustrative purposes only and any duration may be used. Similarly, archive storage 120 illustrates archive storage of over two hours of recorded material. In the example of FIG, 1, assume the viewer wishes to time-shift their viewing by 15 minutes. With recorded material illustrated as gray-shaded, FIG. 1 shows the case at 8:15, whereby half of buffer storage 110 has been filled with recorded material from 8:00 to 8:15. Only half the buffer is filled in this example because this figure depicts the situation soon after present invention was initially turned on. Once the buffer fills up it acts as a circular buffer, as described previously. The underlying context shown in FIG. 1 corresponds with the example set forth in section 3.3.

As depicted for buffer storage 110, within this buffer the user has complete VCR-like control such as rewind and fast-forward. So the viewer may begin playback of the 8:00 material and immediately has the capability to fast-forward up to the contents of the current buffer which in the illustrative example is 8:15. Archive storage 120 maintains an archived copy of all the recorded material.

FIG. 1 is used to illustrate the use of buffer storage 100 and it's relationship to the current time. Recording continues simultaneously during any of these operations, continuing at the position of the current real time as depicted in the figure.

The unique functional advantages of the invention are shown in FIG. 2. This example depicts the situation at 9:00. In this case, buffer storage 210 is now filled with material which was recorded from 8:30 until 9:00 and the viewer has full VCR-like control over this range of time. All components of this figure, timeline 230 random access viewing position 200, buffer storage 210, archive and storage 220 are functionally equivalent to the corresponding elements of FIG. 1. FIG. 2 simply illustrates the conceptual use of the buffer storage at a later time than that of FIG. 1. Also, the buffer storage and archive storage of both FIGS. 1 and 2 correspond directly to the storage in the block diagrams in FIGS. 3 and 4.

FIG. 3 illustrates the operational overview of the preferred embodiment. Analog input video source 300 is connected to capture/compression card 320 which includes capture/compression hardware 330 and decompression playback hardware 340. Storage input connection 340 illustrates the writing of the compressed program data to storage device 380. Storage device 380 corresponds to the aforementioned buffer storage and may also be used as archival storage.

For playback, storage output connection 350 transfers data from storage device 380 to decompression/playback hardware 360. During playback, via video out connection 310, the program is transferred to a standard video device (not shown) such as a TV, monitor or VCR. Recording direction arrow 370 is included to conceptually illustrate the use of storage 380 as a circular buffer as explained previously.

FIG. 4 depicts a block diagram of the preferred embodiment. Housing 400 is an enclosure for the present invention, including necessary power supplies, casing, fans, buttons, power cord and connectors. These components are not depicted but are well-understood in the design and manufacture of consumer (or professional-grade) electronics. Contained within this housing in addition to the aforementioned basic components are: CPU 530, capture/display hardware 500, compression/decompression hardware 480, output display switch 470, network interface 550, I/O controller 570, system RAM 560, system bus 510, storage 580, removable storage 590, set-top-box switch 424, tuner bypass switch 426, capture bypass switch 460, and input monitor switch 428. Also depicted but not included as part of the present embodiment are external components set-top box 410, content provider 420, television 430, monitor 340, VCR 450, telecommunications connection 520, telecommunications cloud 490, workstation 595 and set-top box bypass switch 422.

Content provider 420 comprises, without limitation, over-the-air television broadcasters, cable TV operators, satellite-feed providers and direct broadcast satellite (DBS) broadcasters. In some cases, the program material as made accessible to the user via set-top box 410 instead of directly from content provider 420. Set-top box 410 may be a common cable converter box or a digital video and user-interface box as used in upcoming cable and satellite services. The video format provided by both set-top box 410 and content provider 420 is most often a standard analog video signal and is routed to capture/display hardware 500. However, in some cases a digital video signals is provided and therefore the capture (analog-to-digital conversion) ordinarily provided by capture/display hardware 500 is not needed. Capture input switch 560 is provided for such a circumstance and the input digital video is routed directly to compressor/decompressor 480. This switching may be automatic by the system, automatically controlled by the content provider or set-top box or it may be user-selectable.

In the case of a analog video input signal, the program must first be converted to a digital format. Capture/display hardware 500 is a video capture and playback card. Alternatively, this may be implemented in a chipset form and integrated onto the main circuit board of the system. Capture/display boards are well-known in the art. Current examples include hardware MPEG capture/compression boards commonly used in computer systems. Such boards often integrate the compression element of the present invention, compressor/decompressor 480, into the same board for a full capture, compression, decompression and playback functionality.

Such components may be used in the present invention to implement both capture/display hardware 500 and compressor/decompressor 480. Alternatively, separate boards may be used. However, any of the capture, compression, decompression and display elements may be incorporated directly onto the main circuit board of the invention.

The capture and compression of the incoming video program, or the automatic or user-selectable switching out of the capture element, are all managed under control of CPU 530 which is a conventional microprocessor. Software running on CPU 530 manages the capture, compression and storage of the program. In doing so, it controls system bus 510, to which all major components are connected. In this manner, CPU 530 controls the I/O controller, which in turn is used to operate storage 580 and removable storage 590. Storage 580 may be implemented by one or more digital storage devices for buffer storage and/or archive storage as discussed previously. System RAM 560 is used as needed by the system for software execution and temporary data storage. The software controlling capture/display 500 and compressor/decompressor 480 may use this as buffer memory. In another embodiment, compressor/decompressor 480 may be eliminated entirely, with CPU 530 performing the compression/decompression operations in software, in which case compressor/decompressor 480 uses system RAM 560 as buffer memory for such operations. In a similar embodiment, compressor/decompressor 480 may be eliminated with set-top box 410 performing compression/decompression. And in yet another embodiment, compressor/decompressor 480 and capture/display 500 may both be eliminated, with all of these functions being performed by set-top box 410.

Storage 580 is implemented as any type of digital storage media. This includes, without limitation, internal or external versions of hard disk, optical disk, DVD, magnetic tape and semi-conductor storage. Similar storage solutions may be implemented for removable media 590. Although only one storage device is depicted, more than one may be used.

Network interface 550 connects the device through network connection 520 to telecommunications cloud 490. Telecommunications "cloud" is a term commonly used to denote a myriad of inter-connected telecommunications connection types and interfaces. It is essentially a superset of the Internet and may include networked computers, telephone lines, and other telephone company equipment such as satellite, microwave and so forth. The portion of telecommunications cloud 490 to which the present invention is connected determines the type of network connection 520 and network interface 550. For example, in a home-based embodiment, network interface 550 is likely to be a modem and telecommunications connection would be a telephone line. Other examples include, without limitation, cable modems and cable networks, computer networks such as Ethernet and their associated interfaces, and satellite modems. The present invention is operatively connected through telecommunications cloud 490 to workstation 595. Workstation 595 is any type of computer used by advertisers, broadcasters, ratings companies and so forth to receive indirect feedback from viewers regarding viewing preferences. Data about the user's viewing habits and use of the invention may, at the user's option, be transmitted via network interface 550 through the aforementioned operative link to workstation 595.

Many options are available for implementing the simultaneous read and write of storage 580. Commonly-available hard disks may be used, depending on the data rate of the compressed data stream of the capture/compression hardware. For example, if MPEG-1 video is used, one stream requires a data rate of 1.5 Mbits/sec. Therefore, to simultaneously read and write, storage 580 must be capable of sufficient throughput for one write stream and one read stream, totaling 3.0 Mbits/sec. Such input/output speeds are well within the realm of current hard drives, which can sustain data rates of over 10 Mbits/sec.

Other embodiments can use other solutions for storage 580. For example, some embodiments will record many channels simultaneously and may even play back more than one channel simultaneously to provide a 'picture-in-picture' feature similar to current televisions. The total required bandwidth may exceed the sustained data rates for conventional disk drives. In such a case RAID (Redundant Array of Inexpensive Disks) systems may be used. These systems are disk array subsystems which use several disk drives in parallel to achieve faster overall throughput. Similarly, the present invention may simply incorporate individual drives for each tuned channel. RAM and other high-bandwidth storage solutions may be also be used.

The ultimate use of the recorded data is in the playback. As the user views programming through all the aforementioned features, the data is read from storage 580 or from removable media 590. This compressed data is routed to compressor/decompressor 480 for decompression under control of CPU 530. In some embodiments, the data may be in an uncompressed form and compressor/decompressor 480 may be bypassed. Once the data is uncompressed, it may be routed directly to monitor 440 for viewing on a digital monitor such as those used by computer systems. Set-top box 410 and/or television 430 may also be capable of accepting digital data in either a compressed or uncompressed form and consequently data may be routed there directly. In the preferred embodiment, the uncompressed digital data is routed to capture/display 500 for conversion to an NTSC, PAL, SECAM or other standard video signal for viewing on one or more of the display devices, TV 430, monitor 440 or VCR 450.

What is claimed is:

1. A method for time-shifted viewing of audio/video programs comprising:

receiving one or more audio/video programs from one or more sources, wherein the one or more audio/video programs are associated with data about the programs, the data about the programs provided over a network connection;

storing each of the one or more audio/video programs as program data [in one or more cyclic buffers, whereupon being filled the one or more cyclic buffers begin replacing the oldest of the program data with the newest program data] *in a digital storage device*; and simultaneously providing playback control of the program data independently from storing the one or more audio/video programs, wherein time-shifted viewing is delayed viewing of the one or more audio/video programs currently being received from the one or more sources, the viewing of which may be initiated and controlled simultaneously with the storing of the one or more audio/video programs, and wherein one or more device configuration settings may be configured via a user interface over the network connection, wherein the network connection comprises an Internet *protocol* connection.

2. The method of claim 1, further comprising moving the program data [from the one or more cyclic buffers] to one or more storage devices for archival of the program data.

3. A system for time-shifted viewing of audio/video programs comprising:

an input for receiving one or more audio/video programs from one or more sources, wherein the one or more audio/video programs are associated with data about the programs, the data about the programs provided over a network connection;

[one or more cyclic buffers] *a digital storage device* for storing the one or more programs as program data [in a cyclical fashion whereupon being filled], [said cyclic buffers begin replacing the oldest program data with the newest program data and are] *said digital storage device being* operable for simultaneously reading and writing [of] program data; and a playback control interface for providing playback control of the program data independently from the storing of the program data, wherein time-shifted viewing is delayed viewing of the one or more programs currently being [receiving] *received* from the one or more sources, the viewing of which may be initiated and controlled simultaneously with the storing of the one or more audio/video programs, and wherein one or more device configuration settings may be configured via a user interface over the network connection, wherein the network connection comprises an Internet *protocol* connection.

4. The system of claim 3, further comprising a storage device comprising semi-permanent memory for storage of the one or more audio/video programs.

5. The method of claim 1, wherein the playback control comprises random access play, stop, pause, rewind, and fast-forward functions.

6. The method of claim 5, further comprising capturing the playback control as viewing habit data.

7. The method of claim 6, further comprising storing the viewing habit data.

8. The method of claim 1, wherein the data about the programs comprises plot summary data.

9. The method of claim 1, wherein the data about the programs comprises rating data.

10. The method of claim 1, wherein the data about the programs comprises cast data.

11. The system of claim 3, wherein the playback control interface includes control for random access play, stop, pause, rewind, and fast-forward functionality.

12. The system of claim 11, wherein the playback control functionality is associated with viewing habit data.

13. The system of claim 12, further comprising memory configured to store the viewing habit data.

14. The system of claim 3, wherein the data about the programs comprises plot summary data.

15. The system of claim 3, wherein the data about the programs comprises rating data.

16. The system of claim 3, wherein the data about the programs comprises cast data.

17. A computer-readable storage medium having embodied thereon at least one program, the at least one program being executable by a computer processor to perform a method for time-shifted viewing of audio/video programs comprising:

receiving one or more audio/video programs from one or more sources, wherein the one or more audio/video programs are associated with data about the programs, the data about the programs provided over a network connection;

storing each of the one or more audio/video programs as program data [in one or more cyclic buffers, whereupon being filled the one or more cyclic buffers begin replacing the oldest of the program data with the newest program data] *in a digital storage medium*; and simultaneously providing playback control of the data independently from storing the one or more audio/video programs, wherein time-shifted viewing is delayed viewing of the one or more audio/video programs currently being received from the one or more sources, the viewing of which may be initiated and controlled simultaneously with the storing of the one or more audio/video programs, and wherein one or more device configuration settings may be configured via a user interface over the network connection, wherein the network connection comprises an Internet *protocol* connection.

18. The method of claim 1, wherein the device configuration setting comprises a record timer.

19. The method of claim 1, wherein the device configuration setting comprises a video quality setting.

20. The method of claim 1, wherein the device configuration setting comprises tuning to a particular channel.

21. The system of claim 3, wherein the device configuration setting comprises a record timer.

22. The system of claim 3, wherein the device configuration setting comprises a video quality setting.

23. The system of claim 3, wherein the device configuration setting comprises tuning to a particular channel.

24. The method of claim 1, wherein the receipt of the one or more audio/video programs from the one or more sources occurs simultaneously.

25. The system of claim 3, wherein the input is configured to simultaneously receive the one or more audio/video programs.

26. The computer-readable storage medium of claim 17, wherein the receipt of the one or more audio/video programs from the one or more sources occurs simultaneously.

*27. The method according to claim 1, wherein the digital storage medium comprises one or more cyclic buffers.*

*28. The method according to claim 1, further comprising replacing the oldest program data with the newest program data.*

*29. The system according to claim 3, wherein the digital storage device comprises one or more cyclic buffers.*

*30. The system according to claim 29, wherein said digital storage device replaces the oldest program data with the newest program data when the digital storage device is filled.*

*31. The computer-readable storage medium according to claim 17, wherein the digital storage medium comprises one or more cyclic buffers.*

*32. The method according to claim 1, further comprising storing each of the one or more audio/video programs as program data in one or more cyclic buffers; and*

*replacing the oldest program data with the newest program data when the one or more cyclic buffers become filled.*

*33. A method for time-shifted viewing of audio/video programs comprising:*

*receiving one or more audio/video programs from one or more sources, wherein the one or more audio/video programs are associated with data about the programs, the data about the programs provided over a network connection;*

*storing each of the one or more audio/video programs as program data in one or more digital storage devices; and*

*simultaneously providing playback control of the program data independently from storing the one or more audio/video programs, wherein time-shifted viewing is delayed viewing of the one or more audio/video programs currently being received from the one or more sources, the viewing of which may be initiated and controlled simultaneously with the storing of the one or more audio/*

*video programs, and wherein one or more device configuration settings may be configured via a user interface over the network connection, wherein the network connection comprises an Internet connection.*

*34. The method according to claim 33, wherein the digital storage devices comprise one or more cyclic buffers.*

*35. The method according to claim 34, further comprising replacing the oldest program data with the newest program data when the digital storage devices are filled.*

* * * * *